Nov. 28, 1961   G. F. HAUSMANN   3,010,280

VARIABLE-EXPANSION NOZZLE

Filed March 25, 1958

INVENTOR
GEORGE F. HAUSMANN
BY
ATTORNEY

United States Patent Office 3,010,280
Patented Nov. 28, 1961

3,010,280
VARIABLE-EXPANSION NOZZLE
George F. Hausmann, Glastonbury, Conn., assignor to United Aircraft Corporation, East Hartford, Conn., a corporation of Delaware
Filed Mar. 25, 1958, Ser. No. 723,854
1 Claim. (Cl. 60—35.6)

This invention relates to propulsive nozzles for rocket motors and more particularly to nozzles having fixed throat areas and means for varying the effective exit area of the nozzle.

The thrust of rocket motors or other propulsive systems having convergent-divergent exhaust nozzles with fixed throat and exit areas is compromised over portions of the operating regime where there is a variation of pressure ratio below the design value for the fixed area ratio. For example, the nozzle area ratios for large ballistic missiles are designed to provide maximum efficiency at relatively high altitudes with the result that the efficiency during launch and initial acceleration within the atmosphere is compromised severely. In spite of this compromise in performance, the use of mechanical variable nozzles cannot be justified for certain applications because of the weight and complexity of such systems and the relatively short periods of time where such variations in the nozzle exit area are required.

The purpose of the device described herein is to provide a simple and positive means of effectively varying the exit area of convergent-divergent nozzles having fixed throat areas without the use of movable components of the nozzle wall or mechanical obstructions in the hot gas stream.

The expansion characteristics of a supersonic fluid in a duct or over a surface where the pressure is decreasing (in a downstream direction), as in a convergent-divergent propulsive nozzle, are dictated by the Mach number, ratio of specific heats, the specific volume of the fluid, and the wall inclination at each point on the fluid boundary. For flows where there is no heat addition in the nozzle, such as a conventional rocket nozzle, the over-all expansion characteristics are primarily a function of the operating pressure ratio and the fixed area ratio of the nozzle. The fluid expansion along the diverging wall portion of a supersonic nozzle, according to this invention, can be altered and effectively prevented by locally changing, such as decreasing the specific volume of the fluid as, for example, by adding heat locally. The resulting pressures along the nozzle wall downstream of the point where heat addition is initiated can be held substantially constant or increased (compared to the original values in the case where no heat is added) by adding a specific amount of heat. This heat addition can be controlled to actually decrease the effective exit area of the nozzle.

It is therefore a further objective of this invention to provide a supersonic convergent-divergent nozzle of the type described including means for adding heat as a boundary layer gas adjacent to the walls of the diverging portion of the nozzles to regulate the effective exit area of the fluid stream.

A still further object of this invention is to provide a control for the addition of heating fluid which compares the pressure at a point adjacent the divergent nozzle wall downstream of the point of heat addition with the ambient pressure.

These and other objects of this invention will become readily apparent from the following detailed description of the drawing in which.

Figure 1:
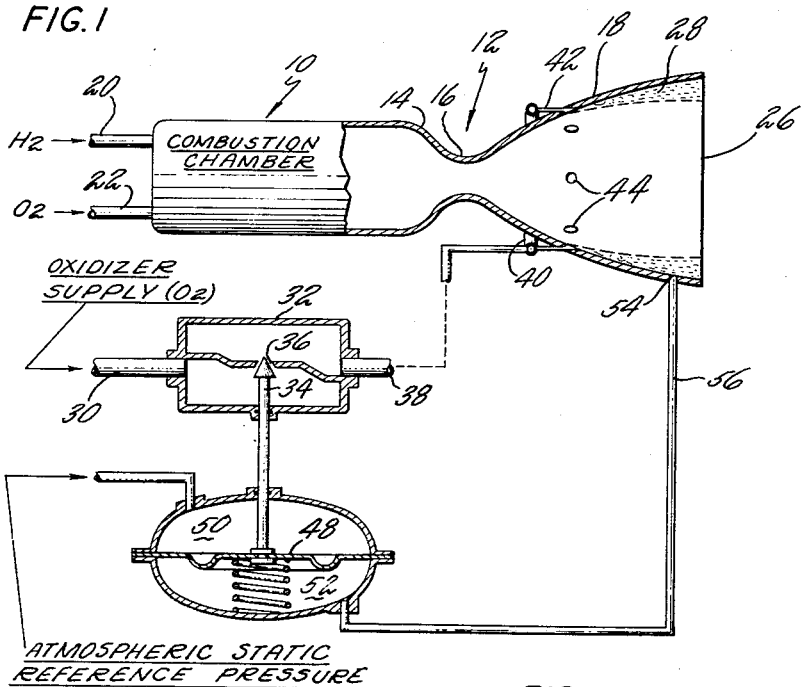
FIG. 1 is a schematic in partial cross section illustrating a rocket thrust chamber, propulsive nozzle, and means for controlling the effective exit area of the nozzle.

Referring to FIG. 1, a combustion chamber is generally indicated at 10 which is intended to produce gases at high temperature and pressure and emit these gases through a supersonic nozzle generally indicated at 12. The supersonic nozzle 12 includes a convergent portion 14, a throat section 16, and a divergent section 18. The combustion chamber 10 may burn a solid propellant, or, as shown, hydrogen or a similar fuel may be fed into the line 20 and oxygen or a similar oxidizer may be fed to the line 22. The fuel and oxidizer will then combine in the combustion chamber 10 to provide the necessary propulsive gases which are emitted through the supersonic nozzle 12.

The diverging walls 18 are of fixed geometry and terminate in an aft opening 26. In order to vary the effective exit area of the nozzle according to this invention, heat is added along the boundary of the wall 18 so that a peripheral layer of fluid 28 is provided. The peripheral layer 28 has at any particular cross section a lower specific volume than that of the main fluid stream at the same cross section in the nozzle. By regulating the amount of heat added or the amount of heating gas added to form the layer 28, the effective exit area of the divergent nozzle portion 18 can be controlled. Since the layer 28 has a lower specific volume, the gases in the main stream will respond as if the expansion were not as rapid as it would be without the heated layer. In other words, the main stream would act as if the divergence of the nozzle were not as great as that physically defined by the wall 18.

Specific volume can be defined as the volume per unit weight of the gas. The invention herein relates to changing this specific volume by adding heat.

When conditions change, as, for example, when the particular rocket gains altitude, the ambient pressure decreases such that the depth of the layer 28 or the amount of heat added in the layer would be reduced thereby permitting the effective exit area to increase.

In a combustion chamber wherein hydrogen and oxygen are burned, the exhaust gases through the nozzle 12 will usually be fuel-rich. Therefore, the heat can be added to the divergent portion 18 by adding a predetermined amount of oxidizer. To this extent supplementary oxygen is fed from a suitable source through the pipe 30 and into the valve 32. The valve 32 includes a movable element 34 which varies the area of the regulating orifice 36. The regulated oxygen is then fed by the line 38 to the manifold 40 from whence it is fed via a number of lines 42 to the ports 44. The movable element 34 is controlled by a spring-loaded diaphragm 48 which responds to atmospheric static pressure in the chamber 50 and also responds to a nozzle pressure which is fed into the chamber 52. The nozzle pressure fed to the chamber 52 is sensed along the divergent wall 18 via a tap 54 adjacent the downstream opening 26 of the nozzle. This pressure is fed via the line 56 to the chamber 52 such that the diaphragm 48 responds to the differential between the pressure chambers 50 and 52.

Figure 3:
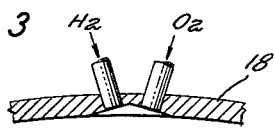
FIG. 3 is an enlarged detailed illustration indicating how the fuel and/or oxygen are injected into the nozzle.
Figure 2:
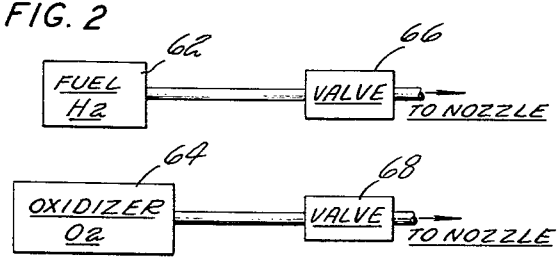
FIG. 2 is a diagrammatic illustration of a portion of a control using both a fuel and oxidizer.

The flow or pressure of the fluid being fed as the heating medium to form the layer 28 in the divergent portion of the supersonic nozzle 12 with altitude will cause the effective expansion ratio of the supersonic nozzle to want to be increased. Therefore, as altitude increases, the flow or pressure of the supplementary oxidizer being fed from the valve 32 to the line 38 and manifold 40 will be decreased. The schedule may take any suitable form depending on the flight conditions to be expected.

Where the exhaust fluid passing through the supersonic nozzle is not fuel-rich, it may be desirable to provide a separate fuel 62 and oxidizer 64 which can be injected together as shown in FIGS. 2 and 3 through the walls of the diverging portion 18 of the supersonic nozzle. In this instance separate valves 66 and 68 for the fuel 62 and 64, respectively, may control the amount of heating products to be injected into the divergent portion of the nozzle. The fuel and oxidizer such as $H_2$ and $O_2$ are injected in close proximity at the wall of the divergent nozzle 18 (see FIG. 3) so that combustion takes place and heat is introduced along the wall of the divergent potrion 18 to form a layer such as 28 as shown in FIG. 1.

As a result of this invention it is apparent that a simple but highly effective means has been provided to vary the effective exhaust area of supersonic nozzles. For the systems of this type, heavy, complicated mechanisms which require changing the physical dimensions of the nozzle are avoided. Furthermore, highly efficient operation of the supersonic nozzle is insured over a wide range of operation with a minimum of weight.

Although only one embodiment of this invention has been illustrated and described herein, it will be apparent that various changes and modifications may be made in the construction and arrangement of the various parts without departing from the scope of this novel concept.

What it is desired by Letters Patent is:

An exhaust nozzle for a rocket jet propulsion device including fixed convergent and divergent sections having a common longitudinal axis, said divergent section terminating in a downstream opening, combustion means for generating a fluid flow through said nozzle at supersonic velocity, means for varying the effective expansion ratio of said divergent section during off-design operation, said varying means comprising means for adding heat substantially only to the local fluid adjacent the inside surface of the peripheral wall defining said divergent portion including nozzle means directed substantially parallel to said axis, said adding means including a source of oxidizer, a source of fuel, means responsive to a differential of fluid pressure in said divergent section and ambient pressure for regulating the flow of oxidizer and fuel from said sources, and means for conducting said fuel and oxidizer from said regulating means to said divergent section to burn said fuel with said oxidizer in said nozzle.

References Cited in the file of this patent

UNITED STATES PATENTS

| | | |
|---|---|---|
| 2,569,996 | Kollsman | Oct. 2, 1951 |
| 2,631,426 | Jewett | Mar. 17, 1953 |
| 2,763,983 | Kafka | Sept. 25, 1956 |
| 2,858,668 | Kelley et al. | Nov. 4, 1958 |
| 2,865,170 | Kadosch | Dec. 23, 1958 |

(Corresponding French Patent 1,130,164, cited below.)

| | | |
|---|---|---|
| 2,952,123 | Rich | Sept. 13, 1960 |

FOREIGN PATENTS

| | | |
|---|---|---|
| 1,057,271 | Franch | Oct. 28, 1953 |
| 1,110,011 | France | Oct. 5, 1955 |
| 1,124,348 | France | June 25, 1956 |
| 1,130,164 | France | Sept. 17, 1956 |
| 654,344 | Great Britain | June 13, 1951 |
| 795,652 | Great Britain | May 28, 1958 |

OTHER REFERENCES

Gas Tables, by Keenan and Kaye, pages 142–147 relied on; copyright 1948; published by John Wiley & Sons, Inc., New York.

Rocket Propulsion Elements, by Sutton, page 34 relied on; copyright 1949, 1956, Second Edition, by John Wiley & Sons, Inc., N.Y.

NACA—Technical Note 2938, "Analysis of Heat Addition in a Convergent-Divergent Nozzle," by Hearth et al., April 1953, 18 pages, page 8 relied on.

"Aircraft and Missile Propulsion," by Zucrow, vol. 1; copyright 1958 by John Wiley and Sons, New York; pages 255–257.